United States Patent
Sun et al.

(10) Patent No.: US 11,061,545 B2
(45) Date of Patent: Jul. 13, 2021

(54) ELECTRONIC APPARATUS, ADJUSTMENT METHOD FOR DISPLAY INTERFACE LAYOUT IN ELECTRONIC APPARATUS, AND ADJUSTMENT SYSTEM FOR DISPLAY INTERFACE LAYOUT

(71) Applicant: JRD COMMUNICATION (SHENZHEN) LTD, Guangdong (CN)

(72) Inventors: Li Sun, Guangdong (CN); Hongri Bian, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 16/352,837

(22) Filed: Mar. 14, 2019

(65) Prior Publication Data

US 2019/0205022 A1 Jul. 4, 2019

Related U.S. Application Data

(63) Continuation of application No. PCT/CN2017/105500, filed on Oct. 10, 2017.

(30) Foreign Application Priority Data

Nov. 18, 2016 (CN) .......................... 201611028325.6

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0482* (2013.01); *G06F 3/0484* (2013.01); *G06F 3/04883* (2013.01); *G06F 2203/04806* (2013.01)

(58) Field of Classification Search
CPC .. G06F 3/04806; G06F 3/0482; G06F 3/0484; G06F 3/04845; G06F 3/04883;
(Continued)

(56) References Cited

U.S. PATENT DOCUMENTS 8,438,496 B1 * 5/2013 Hegde ................... G06F 3/0485
715/784
9,047,142 B2 6/2015 Fleming
(Continued)

FOREIGN PATENT DOCUMENTS

CN 101241413 A 8/2008
CN 101876877 A 11/2010
(Continued)

OTHER PUBLICATIONS

1st Office Action of counterpart Chinese Patent Application No. 201611028325.6 dated Oct. 9, 2019.

*Primary Examiner* — Claudia Dragoescu (57) ABSTRACT

The present disclosure provides an adjustment method for a display interface layout and an adjustment system for a display interface layout. The method may include: receiving an instruction to scale a content in the display interface; determining, in response to the instruction, whether the content scaled in the display interface overflows the display interface, or whether the content scaled in the display interface makes a blank space in the display interface; wherein when the content scaled in the display interface overflows the display interface, hiding a content with a lower level in the contents while the content zooms in; and when the content scaled in the display interface makes a blank space in the display interface, displaying a hidden content with a higher level in the contents while the content zooms out.

20 Claims, 6 Drawing Sheets

(51) Int. Cl.
*G06F 3/0482* (2013.01)
*G06F 3/0488* (2013.01)

(58) Field of Classification Search
CPC ...... G06F 16/26; G06F 16/248; G06F 16/282; G06F 16/93
See application file for complete search history.

(56) References Cited

U.S. PATENT DOCUMENTS

| | | | |
|---|---|---|---|
| 9,329,761 | B2 | 5/2016 | Rodrig et al. |
| 9,977,578 | B1* | 5/2018 | Pereira .................. G06F 3/0483 |
| 2014/0033124 | A1* | 1/2014 | Sorrick ................... G06F 3/048 715/810 |
| 2014/0160039 | A1* | 6/2014 | Hanyu ................ G06F 3/04883 345/173 |
| 2015/0143287 | A1 | 5/2015 | Khanahmadi |
| 2015/0177979 | A1* | 6/2015 | Johansson ............. G06F 3/0416 715/763 |

FOREIGN PATENT DOCUMENTS

| | | |
|---|---|---|
| CN | 103649895 A | 3/2014 |
| CN | 103927495 A | 7/2014 |
| CN | 105278910 A | 1/2016 |
| CN | 105718228 A | 6/2016 |
| CN | 105745612 A | 7/2016 |
| CN | 106648341 A | 5/2017 |

\* cited by examiner

ELECTRONIC APPARATUS, ADJUSTMENT METHOD FOR DISPLAY INTERFACE LAYOUT IN ELECTRONIC APPARATUS, AND ADJUSTMENT SYSTEM FOR DISPLAY INTERFACE LAYOUT

CROSS-REFERENCE TO RELATED APPLICATIONS

The present application is a continuation-application of International (PCT) Patent Application No. PCT/CN2017/105500, filed on Oct. 10, 2017, which claims foreign priority of Chinese Patent Application No. 201611028325.6, filed on Nov. 18, 2016 in the National Intellectual Property Administration of China, the entire contents of which are hereby incorporated by reference.

FIELD

The described embodiments relate to a computer technology, and more particularly, to an electronic apparatus, an adjustment method for a display interface layout and an adjustment system for a display interface layout.

BACKGROUND

With the development of technology, electronic apparatuses such as computers and smart phones have become indispensable tools for people's daily life, study, and work. As requirements of people increase, more and more plug-ins, applications, and the like, are displayed on the desktop of electronic apparatuses. As a main interface for the user to interact with an application and the like, an operation interface of the application or the like, plays an important role.

The operation interface of an application or the like usually has a plurality of function bars, and different function bars often have different effects on a user's operation of the application. However, a layout of the operation interface of the application of the electronic apparatus is preset in advance, and the user cannot adjust the size of the function bar according to requirements of the user. For some function bars that are infrequently used or have a very small function, cannot be properly hidden or performed other related operations, by the user, therefore requirements of the user is not met.

SUMMARY

The present disclosure provides an electronic apparatus, an adjustment method for a display interface layout and an adjustment system, to solve a technical problem that an operation interface of an application cannot be adjusted in the related art.

In order to solve the above-mentioned technical problem, a technical solution adopted by the present disclosure is to provide an electronic apparatus, including: a communication circuit, configured to receive an instruction, wherein the instruction is configured to scale at least one of a plurality of contents in a display interface, and the plurality of contents are arranged in the display interface, and each of the plurality of contents has a defined level; a processor, configured to perform operations including: determining a first region that a region occupied by all contents in the display interface before the at least one of the plurality of contents is scaled; and predicting the second region that a region occupied by the all contents in the display interface after the at least one of the plurality of contents is scaled; wherein when the second region is greater than the first region, the processor determines that, the at least one of the plurality of contents scaled in the display interface overflows the display interface; when the second region is less than the first region, the processor determines that, the at least one of the plurality of contents scaled in the display interface makes a blank space in the display interface; the operations further including: when the at least one of the plurality of contents scaled in the display interface overflows the display interface, hiding a content with a lower level in the plurality of contents while the content zooms in; and when the at least one of the plurality of contents scaled in the display interface makes a blank space in the display interface, displaying a hidden content with a higher level in the plurality of contents while the content zooms out; a memory, configured to save a display interface layout after the at least one of the plurality of contents is scaled, so as to be used by a user; and a display screen, configured to display the adjusted display interface; wherein the processor is coupled to the communication circuit, the memory, and the display screen; and the instruction is generated by at least one of a sliding physical device, a rotating physical device, or a multi-touch or sliding touch.

In order to solve the above-mentioned technical problem, a technical solution adopted by the present disclosure is to provide an adjustment method for a display interface layout, including: receiving an instruction to scale at least one of a plurality of contents in the display interface, wherein the plurality of contents are arranged in the display interface, and each of the plurality of contents has a defined level; determining, in response to the instruction, whether the at least one of the plurality of contents scaled in the display interface overflows the display interface, or whether the at least one of the plurality of contents scaled in the display interface makes a blank space in the display interface; wherein when the at least one of the plurality of contents scaled in the display interface overflows the display interface, hiding a content with a lower level in the plurality of contents while the content zooms in; and when the at least one of the plurality of contents scaled in the display interface makes a blank space in the display interface, displaying a hidden content with a higher level in the plurality of contents while the content zooms out.

In order to solve the above-mentioned technical problem, a technical solution adopted by the present disclosure is to provide an adjustment system for a display interface layout, including: a processor; a memory coupled to the processor to store instructions, which when executed by the processor, cause the processor to perform operations, the operations including: receiving an instruction by the adjustment system, to scale at least one of a plurality of contents in the display interface, wherein the plurality of contents are arranged in the display interface, and each of the plurality of contents has a defined level; determining in response to the instruction, whether the at least one of the plurality of contents scaled in the display interface overflows the display interface, or whether the at least one of the plurality of contents scaled in the display interface makes a blank space in the display interface; wherein when the at least one of the plurality of contents scaled in the display interface overflows the display interface, hiding a content with a lower level in the plurality of contents while the content zooms in; and when the at least one of the plurality of contents scaled in the display interface makes a blank space in the display interface, displaying a hidden content with a higher level in the plurality of contents while the content zooms out.

DETAILED DESCRIPTION

Figure 1:
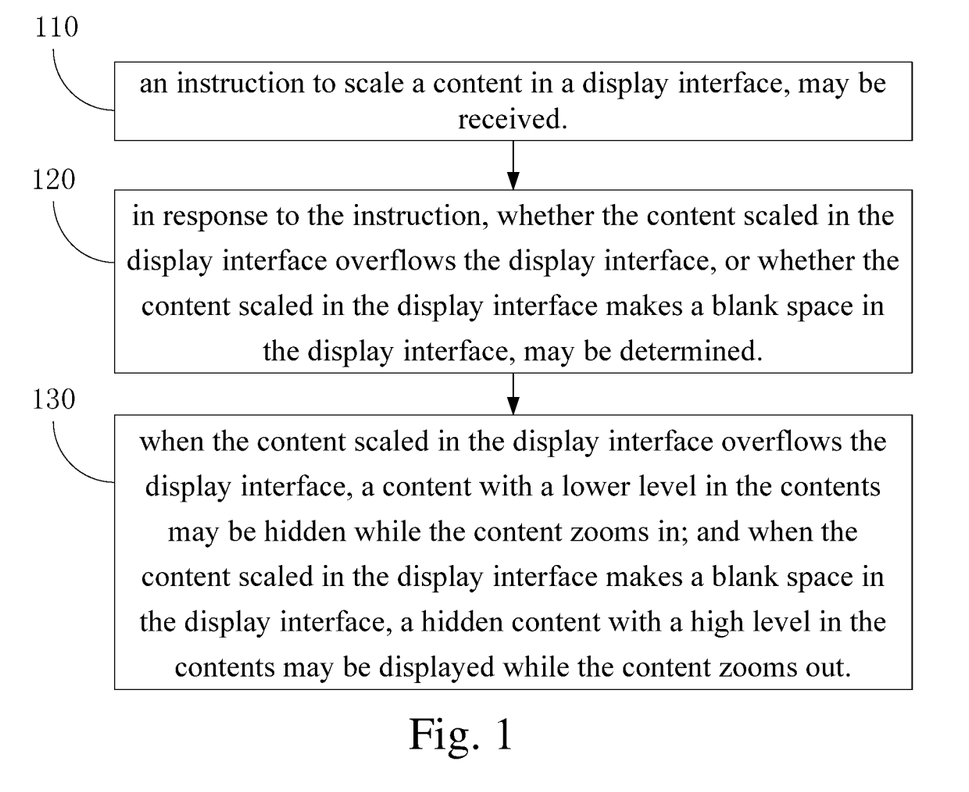
FIG. 1 is a flow chart of an adjustment method for a display interface layout in accordance with an embodiment in the present disclosure.

FIG. 1 illustrates a flow chart of an adjustment method for a display interface layout in accordance with an embodiment in the present disclosure. The method may include operations in the following blocks.

Block S110, an instruction to scale a content in a display interface, may be received.

The display interface may generally refer to an operation interface for a human-computer interaction, in an application, a plug-in, and so on installed in an electronic apparatus (such as a computer, a tablet, a smart phone, a smart watch, and so on).

Figure 3:
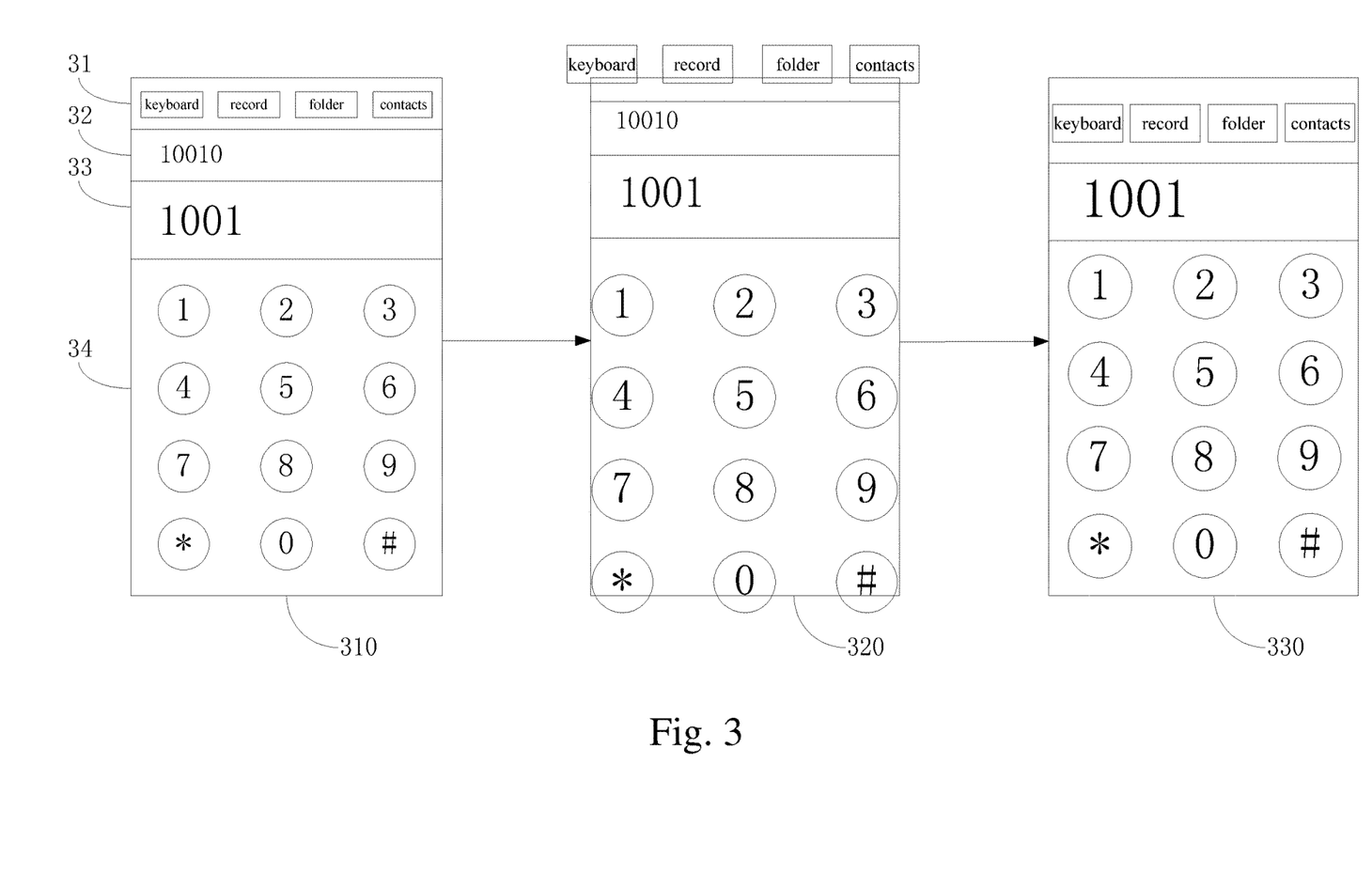
FIG. 3 is a flow chart of an adjustment method for a display interface layout in accordance with an application scenario in the present disclosure.

Contents in a display interface may refer to a content of an operation interface that guides users to operate an application to realize functions. FIG. 3 illustrates a flow chart of an adjustment method for a display interface layout in accordance with an application scenario in the present disclosure. A navigation bar 31, a number association region 32, a number displaying region 33, a keyboard region 34, and other contents may be arranged in a display interface of a mobile phone. The contents may be usually presented in forms of text or icons.

The instruction to scale the content in the display interface may refer to at least one of a button configured to scale the content in the display interface (such as a volume button, a switch button, a home button, and so on), a preset action on a touch screen (such as two-touch, multi-touch on the touch screen), a preset action on an electronic apparatus (such as shaking the electronic apparatus twice).

Block S120, in response to the instruction, whether the content scaled in the display interface overflows the display interface, or whether the content scaled in the display interface makes a blank space in the display interface, may be determined.

Operations in response to the instruction, may refer to at least one of operations of continuously or intermittently pressing, sliding, and rotating buttons on the electronic apparatus (such as a volume button, a switch button, and a home button, which are configure to adjust contents in the display interface), operations of touching and sliding up, down, left, and right on a touch screen, and operations of tilting a mobile phone toward a predetermined direction (such an accelerometer, a gravity sensor, and so on, operated by a medical gravity sensing principle in an electronic apparatus).

For example, in a display interface layout adjustment mode, an interface adjustment button may be rotated counterclockwise, and an operation interface may be continuously increased; or the interface adjustment button may be rotated clockwise, and the operation interface may be continuously decreased.

The content scaled in the display interface overflowing the display interface, may refer to that, after the instruction is responded to scale the content in the display interface, a screen of an intelligent electronic apparatus (such as the mobile phone), may not accommodate the current content in the display interface scaled by an adjustment operation. The content scaled in the display interface making a blank space in the display interface, may refer to that, there is a blank space between boundaries of screen of an intelligent electronic apparatus and a the current content in the display interface scaled by an adjustment operation. In other application scenarios, it may be determine by preset a certain size. When the content scaled in the display interface exceeds the display interface in the certain size, it may determine that the content scaled in the display interface overflows the display interface. When there is the certain size between the content scaled in the display interface and any one of boundaries of the display interface, it may determine that the content scaled in the display interface makes a blank space in the display interface Block S130, when the content scaled in the display interface overflows the display interface, a content with a lower level in the contents may be hidden while the content zooms in; and when the content scaled in the display interface makes a blank space in the display interface, hidden a content with a higher level in the contents may be displayed while the content zooms out.

Each of the contents may have a defined level. The level of the content may be defined according to, a degree of importance of a function when the display interface is operated. When a content has a higher degree of importance than other contents, the level of the content having the higher degree of importance, may be higher than the level of other contents; and when a content has a lower degree of importance than other contents, the level of the content having the lower degree of importance, may be lower than the level of other contents.

For example, a mobile phone call interface shown in FIG. 3 may be defined a keyboard region 34 as A level, a number display region 33 as B level, a navigation bar 31 as C level, and an associated number region 32 as D level, according to functions of an application and usual usage habits of a user.

Figure 4:
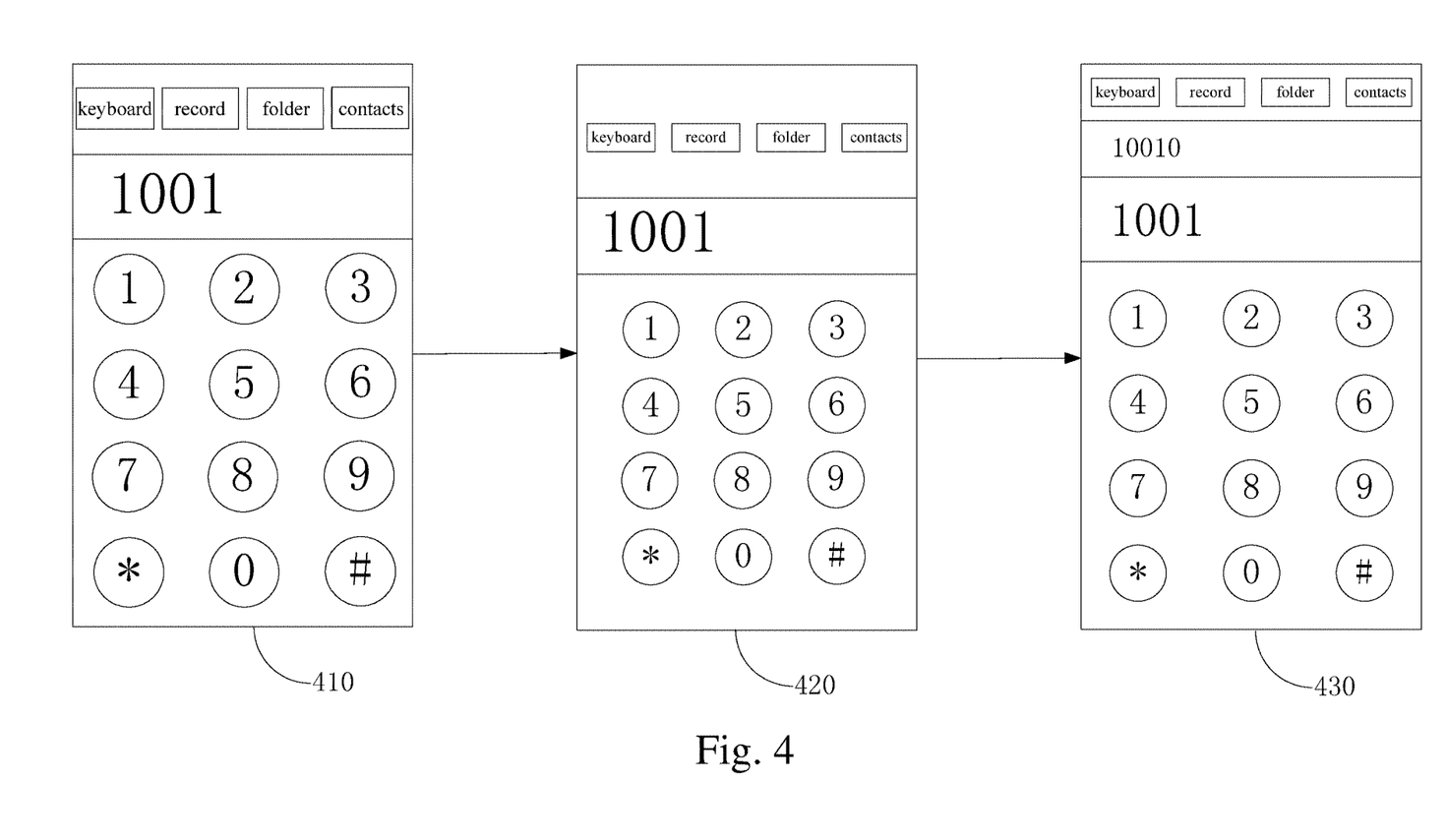
FIG. 4 is a flow chart of an adjustment method for a display interface layout in accordance with another application scenario in the present disclosure.

The hiding the content with the lower level in the contents, may include that when the content scaled in the display interface overflows the display interface, a content with a lowest level in the current display interface may be hidden. For example, a mobile phone call interface may be a current interface 310 before the mobile phone call interface is adjusted, and the current interface 310 may have a keyboard region 34 with A level, a number display region 33 with B level, a navigation bar 31 with C level, and an associated number region 32 with D level. When the current interface 310 responds to a zoom in instruction, and contents scaled in the current interface 310 overflows the current interface 310 to become an interface 320 after determined, the associated number region 32 with D level may be automatically hidden, and remaining interface contents in the interface 320 may be fine-tuned to keep a balanced appearance of a display interface, to obtain an interface 330. The fine-tuning may be to compress or stretch contents in the current interface horizontally or vertically so that size of each content may satisfies size of the current interface. When the zoom in instruction is responded, and the content scaled in the current interface still overflows the current interface after a content with a lowest level in the current interface has been hidden, a content with a lowest level in remaining contents may be hidden until the display interface may be normally operated, and the display interface may be balanced. The displaying the hidden content with the higher level in the contents, may include that when the content scaled in the display interface makes a blank space in the display interface, a content with a highest level in the current display interface may be displayed. As shown in FIG. 4, it may be assumed that there are only the keyboard region 34 with A level, the number display region 33 with B level, and the navigation bar 31 with C level in the current display interface, and the associated number region 32 with D level has been hidden. When a current interface 410 responds to a zoom out instruction, and contents scaled in the current interface 410 makes a blank space in the display interface to become an interface 420 after determined, the associated number region 32 with D level may be automatically displayed, to obtain an interface 430. When the zoom out instruction is responded, and the content scaled in the current interface still makes a blank space in the current interface after a content with a highest level in the current interface has been displayed, a content with a highest level in remaining contents may be displayed until the blank space is not exist. When all contents in the current interface have been displayed, and there is no hidden contents, the display interface may not respond even if the zoom out instruction is applied to the current interface.

By the above-mentioned embodiment, a user may conveniently set a size of a content in a display interface, to zoom in a display interface with an important content, and to hide a display interface with an unimportant content, according to habits and preferences of the user.

Figure 2:
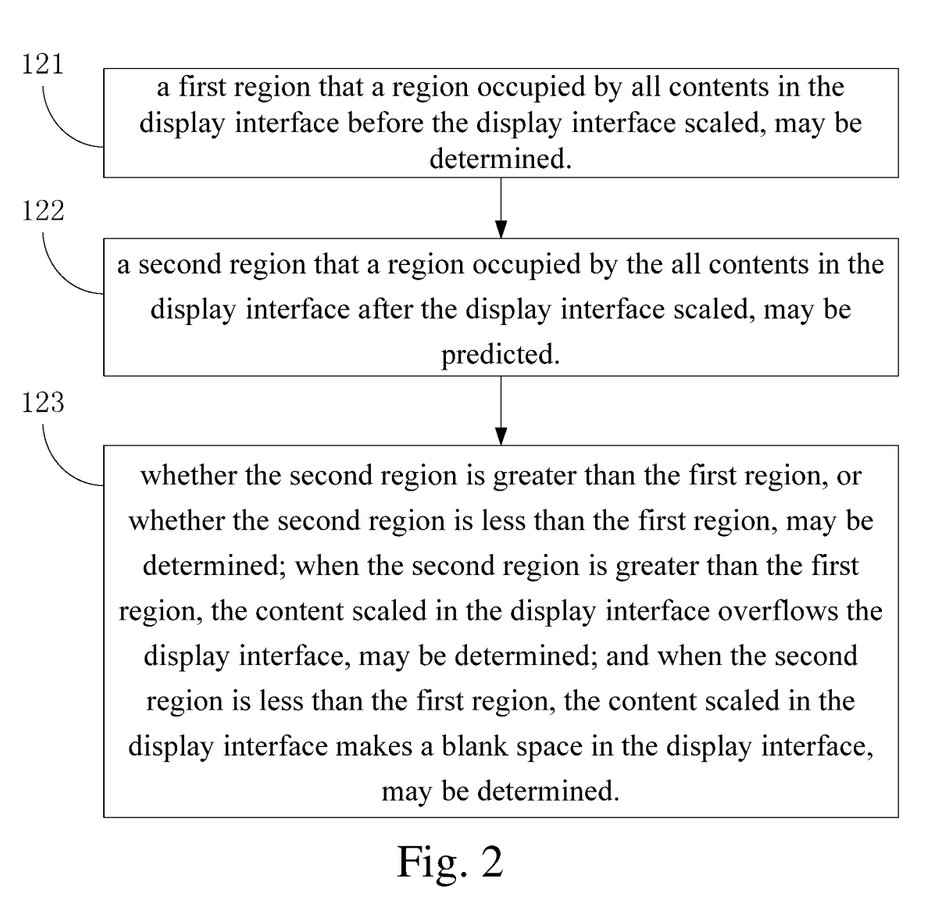
FIG. 2 is a flow chart of an adjustment method for a display interface layout in accordance with another embodiment in the present disclosure.

FIG. 2 illustrates a flow chart of an adjustment method for a display interface layout in accordance with another embodiment in the present disclosure. The adjustment method in this embodiment is based on the above-mentioned embodiment, and the operation in block S120 may further include operations in the following blocks.

Block S121, a first region that a region occupied by all contents in the display interface before the display interface is scaled, may be determined.

Block S122, a second region that a region occupied by the all contents in the display interface after the display interface is scaled, may be predicted.

The region occupied by all the content in the display interface may refer to a geometric region occupied by the content in the display interface.

Block S123, whether the second region is greater than the first region, or whether the second region is less than the first region, may be determined; when the second region is greater than the first region, the content scaled in the display interface overflows the display interface, may be determined; and when the second region is less than the first region, the content scaled in the display interface makes a blank space in the display interface, may be determined.

A first direction may extend outward from a center of the second region. A first distance may be defined between the center of the second region and a boundary of the second region on the first direction. A second distance may be defined between the center of the second region and a boundary of the display interface on the first direction. The second region overflowing may refer to that, the first distance may be greater than the second distance, and may be greater than a first threshold. The second region having the blank space may refer to that, the first distance may be less than the second distance, and may be greater than a second threshold. The center of the second region may refer to a geometric center of the second region. The first threshold may be different values according to different interface contents to be hidden. For example, when the display interface is zoomed in and the first threshold is exceeded to hide a content with D level, the first threshold may be set to half of a shortest distance from a geometric center of a region where the content with D level is located to a boundary of the region. The second threshold may be similar to the first threshold, and the second threshold may be different values according to different interface contents.

Figure 5:
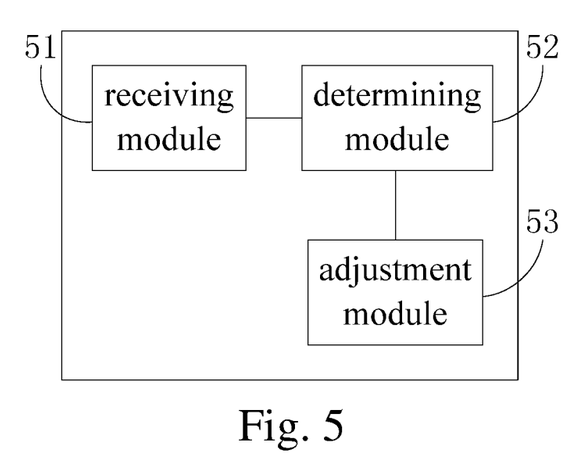
FIG. 5 is a structural illustration of an adjustment system for a display interface layout in accordance with an embodiment in the present disclosure.

FIG. 5 illustrates a structural illustration of an adjustment system for a display interface layout in accordance with an embodiment in the present disclosure. The adjustment system may include a receiving module 51, a determining module 52, and an adjustment module 53.

The receiving module 51 may be configured to receive an instruction to scale a content in the display interface.

The determining module 52 may be configured to determine in response to the instruction, whether the content scaled in the display interface overflows the display interface, or whether the content scaled in the display interface makes a blank space in the display interface.

The adjustment module 53 may be configured to perform operations including: hiding a content with a lower level in the contents while the content zooms in, when the content scaled in the display interface overflows the display interface; and displaying a hidden content with a higher level in the contents while the content zooms out, when the content scaled in the display interface makes a blank space in the display interface.

In this embodiment, the receiving module 51 may receive an instruction to scale a content in the display interface. The determining module 52 may determine in response to the instruction, whether the content scaled in the display interface overflows the display interface, or whether the content scaled in the display interface makes a blank space in the display interface. The adjustment module 53 may perform operations including: hiding a content with a lower level in the contents and save the adjusted display interface, while the content zooms in, when the content scaled in the display interface overflows the display interface; and displaying a hidden content with a higher level in the contents and save the adjusted display interface, while the content zooms out, when the content scaled in the display interface makes a blank space in the display interface.

Figure 6:
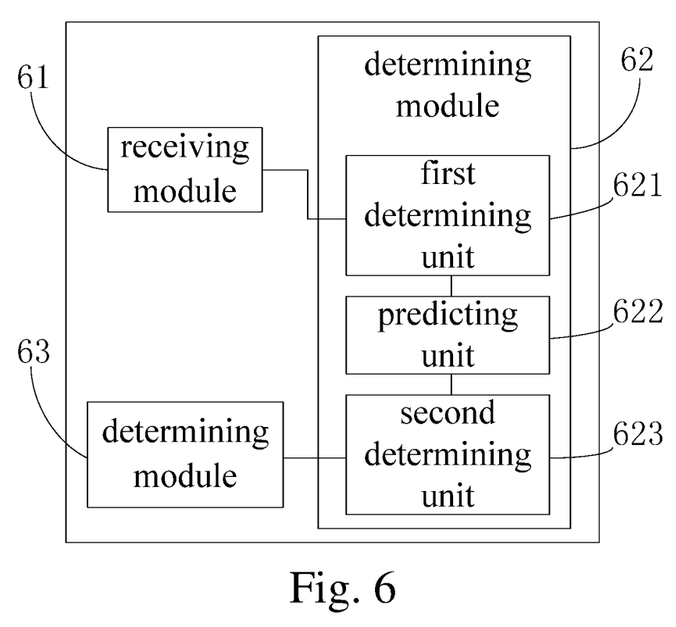
FIG. 6 is a structural illustration of an adjustment system for a display interface layout in accordance with another embodiment in the present disclosure.

FIG. 6 illustrates a structural illustration of an adjustment system for a display interface layout in accordance with another embodiment in the present disclosure. The adjustment system may include a receiving module 61, a determining module 62, and an adjustment module 63.

The receiving module 61 may be configured to receive an instruction to scale a content in the display interface.

The determining module 62 may be configured to scale the display interface in response to the instruction.

The determining module 62 may further include a first determining unit 621, a predicting unit 622, and a second determining unit 623. The first determining unit 621 may be configured to determine a first region that a region occupied by all contents in the display interface before the display interface is scaled. The predicting unit 622 may be configured to predict a second region that a region occupied by the all contents in the display interface after the display interface is scaled. The second determining unit 623 may be configured to determine whether the second region is greater than the first region.

The adjustment module 63 may be configured to perform operations including: hiding a content with a lower level in the contents while the content zooms in, when the content scaled in the display interface overflows the display interface; and displaying a hidden content with a higher level in the contents while the content zooms out, when the content scaled in the display interface makes a blank space in the display interface.

In this embodiment, the receiving module 61 may receive an instruction to scale a content in the display interface. The determining module 62 may response to the instruction. The first determining unit 621 may determine a first region that a region occupied by all contents in the display interface before the display interface is scaled. The predicting unit 622 may predict a second region that a region occupied by the all contents in the display interface after the display interface is scaled. The second determining unit 623 may determine whether the second region is greater than the first region. When the content scaled in the display interface overflows the display interface, the adjustment module 63 may hide a content with a lower level in the contents while the content zooms in; when the content scaled in the display interface makes a blank space in the display interface, the adjustment module 63 may display a hidden content with a higher level in the contents while the content zooms out.

The above-mentioned adjustment system may meet a requirement that a user may adjust a display interface of an application himself, to zoom in the display interface with an important content, and to hide the display interface with an unimportant content.

Figure 7:
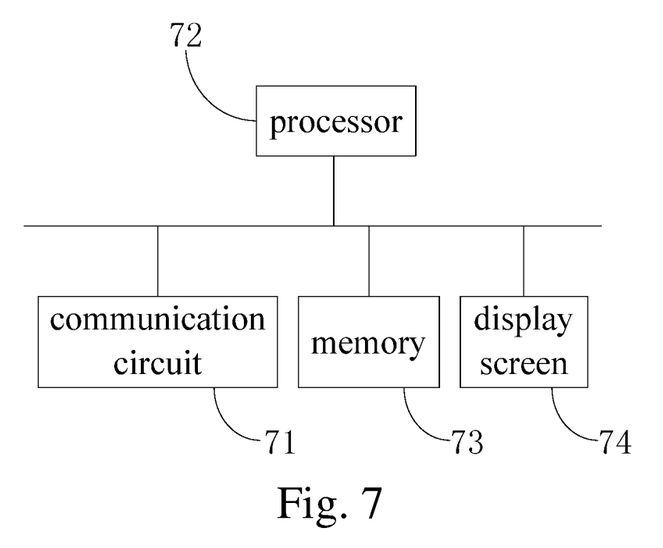
FIG. 7 is a structural illustration of an electronic apparatus in accordance with an embodiment in the present disclosure.

FIG. 7 illustrates a structural illustration of an electronic apparatus in accordance with an embodiment in the present disclosure. The electronic apparatus may include a communication circuit 71, a processor 72, a memory 73 and a display screen 74. The communication circuit 71, the memory 73 and the display screen 74 may be all coupled to the processor 72.

The communication circuit 71 may be configured to receive an instruction to scale a content in the display interface.

The processor 72 may be configured to determine in response to the instruction, whether the content scaled in the display interface overflows the display interface, or whether the content scaled in the display interface makes a blank space in the display interface. When the content scaled in the display interface overflows the display interface, a content with a lower level in the contents may be may be hidden while the content zooms in; when the content scaled in the display interface makes a blank space in the display interface, hidden a content with a higher level in the contents may be displayed while the content zooms out.

The memory 73 may be configured to save a scaled display interface layout, so as to be used by a user.

The display screen 74 may be configured to display the display interface. For example, the display screen 74 may display an operating display interface of an application or a plug-in, and may display an updated operating display interface of the application or the plug-in when the operating display interface of the application or the plug-in is changed.

In this embodiment, the electronic apparatus may be an electronic apparatus having a display function such as a computer, a tablet, a smart phone, and a smart watch, a MP3 player, and a MP4 player. A user may scale an operation display interface of an application in the electronic apparatus by a physical device or a touch screen of the electronic apparatus. A relatively unimportant content in the display interface may be hidden, and a relatively important content in the display interface may be displayed, while the operation display interface is scaled. The electronic apparatus may be easy to operate, and may enhance a functional diversity of smart electronic apparatuses.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. An electronic apparatus, comprising:
    a communication circuit, configured to receive an instruction, wherein the instruction is configured to scale at least one of a plurality of contents in a display interface, and the plurality of contents are arranged in the display interface, and each of the plurality of contents has a defined level;
    a processor, configured to perform operations comprising:
    determining a first region that a region occupied by all contents in the display interface before the at least one of the plurality of contents is scaled; and
    predicting the second region that a region occupied by the all contents in the display interface after the at least one of the plurality of contents is scaled;
    wherein
    when the second region is greater than the first region, the processor determines that, the at least one of the plurality of contents scaled in the display interface overflows the display interface;
    when the second region is less than the first region, the processor determines that, the at least one of the plurality of contents scaled in the display interface makes a blank space in the display interface;
    the operations further comprising:
    when the at least one of the plurality of contents scaled in the display interface overflows the display interface, automatically hiding a content with a lower level in the plurality of contents while the content zooms in; and
    when the at least one of the plurality of contents scaled in the display interface makes a blank space in the display interface, automatically displaying a hidden content with a higher level in the plurality of contents in the blank space of the current display interface while the content zooms out;
    a memory, configured to save a display interface layout after the at least one of the plurality of contents is scaled, so as to be used by a user; and
    a display screen, configured to display the adjusted display interface;
    wherein
    the processor is coupled to the communication circuit, the memory, and the display screen; and
    the instruction is a scaled instruction generated by at least one of a button configured to scale the at least one of the plurality of contents in the display interface, and the at least one of the button comprises one of a volume button, a switch button, and a home button.

2. The electronic apparatus according to claim 1, wherein the hiding the content with the lower level in the plurality of contents, comprises,
when the second region overflows, automatically hiding a content with a lowest level in the plurality of contents in the current display interface;
the displaying the hidden content with the higher level in the plurality of contents, comprises,
when the second region has a blank space, automatically displaying a content with a highest level in the plurality of contents in the blank space of the current display interface.

3. The electronic apparatus according to claim 1, wherein
a first direction extends outward from a center of the second region;
a first distance is defined between the center of the second region and a boundary of the second region on the first direction;
a second distance is defined between the center of the second region and a boundary of the display interface on the first direction;
the second region overflowing is determined, when the first distance is greater than the second distance, and is greater than a first threshold; and
the second region having the blank space is determined, when the first distance is less than the second distance, and is greater than a second threshold.

4. The electronic apparatus according to claim 1, wherein
the level of the each of the plurality of contents is defined according to, a degree of importance of a function when the display interface is operated;
when a content has a higher degree of importance than other contents, the level of the content having the higher degree of importance, is higher than the level of other contents; and
when a content has a lower degree of importance than other contents, the level of the content having the lower degree of importance, is lower than the level of other contents.

5. An adjustment method for a display interface layout in an electronic apparatus, comprising:
receiving an instruction by a processor, to scale at least one of a plurality of contents in the display interface, wherein the plurality of contents are arranged in the display interface, and each of the plurality of contents has a defined level;
determining by the processor, in response to the instruction, whether the at least one of the plurality of contents scaled in the display interface overflows the display interface, or whether the at least one of the plurality of contents scaled in the display interface makes a blank space in the display interface;
wherein
when the at least one of the plurality of contents scaled in the display interface overflows the display interface, hiding a content by the processor with a lower level in the plurality of contents while the content zooms in; and
when the at least one of the plurality of contents scaled in the display interface makes a blank space in the display interface, displaying a hidden content by the processor with a higher level in the plurality of contents in the blank space of the current display interface while the content zooms out;
the instruction is a scaled instruction generated by at least one of a button configured to scale the at least one of the plurality of contents in the display interface, and the at least one of the button comprises one of a volume button, a switch button, and a home button.

6. The adjustment method according to claim 5, wherein
the determining by the processor, in response to the instruction, whether the at least one of the plurality of contents scaled in the display interface overflows the display interface, or whether the at least one of the plurality of contents scaled in the display interface makes the blank space in the display interface, comprises:
determining by the processor, a first region that a region occupied by all contents in the display interface before the display interface is scaled; and
predicting by the processor, a second region that a region occupied by the all contents in the display interface after the display interface is scaled;
determining by the processor, whether the second region is greater than the first region; or whether the second region is less than the first region;
wherein
when the second region is greater than the first region, determining that by the processor, the at least one of the plurality of contents scaled in the display interface overflows the display interface;
when the second region is less than the first region, determining that by the processor, the at least one of the plurality of contents scaled in the display interface makes a blank space in the display interface.

7. The adjustment method according to claim 6, wherein
a first direction extends outward from a center of the second region;
a first distance is defined between the center of the second region and a boundary of the second region on the first direction;
a second distance is defined between the center of the second region and a boundary of the display interface on the first direction;
the second region overflowing is determined, when the first distance is greater than the second distance, and is greater than a first threshold; and
the second region having the blank space is determined, when the first distance is less than the second distance, and is greater than a second threshold.

8. The adjustment method according to claim 6, wherein
the hiding the content by the processor with the lower level in the plurality of contents, comprises,
when the second region overflows, hiding a content by the processor with a lowest level in the plurality of contents in the current display interface;
the displaying the hidden content by the processor with the higher level in the plurality of contents, comprises,
when the second region has a blank space, displaying a content by the processor with a highest level in the plurality of contents in the blank space of the current display interface.

9. The adjustment method according to claim 7, wherein
the hiding the content by the processor with the lower level in the plurality of contents, comprises,
when the second region overflows, hiding a content by the processor with a lowest level in the plurality of contents in the current display interface;
the displaying the hidden content by the processor with the higher level in the plurality of contents, comprises,
when the second region has a blank space, displaying a content by the processor with a highest level in the plurality of contents in the blank space of the current display interface.

10. The adjustment method according to claim 5, wherein
the level of the each of the plurality of contents is defined
according to, a degree of importance of a function when
the display interface is operated;
when a content has a higher degree of importance than
other contents, the level of the content having the
higher degree of importance, is higher than the level of
other contents; and
when a content has a lower degree of importance than
other contents, the level of the content having the lower
degree of importance, is lower than the level of other
contents.

11. An adjustment system for a display interface layout, comprising:
a processor;
a memory coupled to the processor to store instructions, which when executed by the processor, cause the processor to perform operations, the operations comprising:
receiving an instruction configured to scale at least one of a plurality of contents in the display interface, wherein the plurality of contents are arranged in the display interface, and each of the plurality of contents has a defined level;
determining in response to the instruction, whether the at least one of the plurality of contents scaled in the display interface overflows the display interface, or whether the at least one of the plurality of contents scaled in the display interface makes a blank space in the display interface;
wherein
when the at least one of the plurality of contents scaled in the display interface overflows the display interface, hiding a content with a lower level in the plurality of contents while the content zooms in; and
when the at least one of the plurality of contents scaled in the display interface makes a blank space in the display interface, displaying a hidden content with a higher level in plurality of contents while the content zooms out;
the instruction is a scaled instruction generated by at least one of a button configured to scale the at least one of the plurality of contents in the display interface, and the at least one of the button comprises one of a volume button, a switch button, and a home button.

12. The adjustment system according to claim 11, wherein the operations further comprise:
determining a first region that a region occupied by all contents in the display interface before the display interface is scaled;
predicting a second region that a region occupied by the all contents in the display interface after the display interface is scaled; and
determining, whether the second region is greater than the first region;
wherein
when the second region is greater than the first region, determining that, the at least one of the plurality of contents scaled in the display interface overflows the display interface;
when the second region is less than the first region, determining that, the at least one of the plurality of contents scaled in the display interface makes a blank space in the blank space of the display interface.

13. The adjustment system according to claim 12, wherein
a first direction extends outward from a center of the second region;
a first distance is defined between the center of the second region and a boundary of the second region on the first direction;
a second distance is defined between the center of the second region and a boundary of the display interface on the first direction;
the second region overflowing is determined, when the first distance is greater than the second distance, and is greater than a first threshold; and
the second region having the blank space refers is determined, when the first distance is less than the second distance, and is greater than a second threshold.

14. The adjustment system according to claim 12, wherein
the hiding the content with the lower level in the plurality of contents, comprises,
when the second region overflows, hiding a content with a lowest level in the plurality of contents in the current display interface;
the displaying the hidden content with the higher level in the plurality of contents, comprises,
when the second region has a blank space, displaying a content with a highest level in the plurality of contents in the blank space of the current display interface.

15. The adjustment system according to claim 13, wherein
the hiding the content with the lower level in the plurality of contents, comprises,
when the second region overflows, hiding a content with a lowest level in the plurality of contents in the current display interface;
the displaying the hidden content with the higher level in the plurality of contents, comprises,
when the second region has a blank space, displaying a content with a highest level in the plurality of contents in the current display interface.

16. The adjustment method according to claim 11, wherein
the level of the each of the plurality of contents is defined according to, a degree of importance of a function when the display interface is operated;
when a content has a higher degree of importance than other contents, the level of the content having the higher degree of importance, is higher than the level of other contents; and
when a content has a lower degree of importance than other contents, the level of the content having the lower degree of importance, is lower than the level of other contents.

17. The adjustment method according to claim 1, wherein
the level of the each of the plurality of contents is defined according to, a degree of importance of a function when the display interface is operated;
when a content has a higher degree of importance than other contents, the level of the content having the higher degree of importance, is higher than the level of other contents; and
when a content has a lower degree of importance than other contents, the level of the content having the lower degree of importance, is lower than the level of other contents.

18. The adjustment method according to claim 1, wherein
after hiding a content with a lower level in the plurality of contents,
remaining interface contents in the interface is fine-tuned to keep a balanced appearance of a display interface;

wherein, the fine-tuning is to compress or stretch contents in the current interface horizontally or vertically so that size of each content satisfies size of the current interface.

19. The adjustment method according to claim 1, wherein when all contents in the current interface have been displayed, and there is no hidden contents, the display interface does not respond even if the zoom out instruction is applied to the current interface.

20. The adjustment method according to claim 3, wherein the first threshold has different values according to different interface contents to be hidden, the second threshold has different values according to different interface contents;

when the display interface is zoomed in and the first threshold is exceeded to hide a content with a lower level, the first threshold is set to half of a shortest distance from a geometric center of a region where the content with a lower level is located to a boundary of the region.

* * * * *